US008127178B2

(12) United States Patent
Mizuno

(10) Patent No.: US 8,127,178 B2
(45) Date of Patent: Feb. 28, 2012

(54) IMAGE FORMING APPARATUS, METHOD OF CONTROLLING IMAGE FORMING APPARATUS, PROGRAM, AND STORAGE MEDIUM

(75) Inventor: Takafumi Mizuno, Higashimurayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 12/019,604

(22) Filed: Jan. 24, 2008

(65) Prior Publication Data

US 2008/0184069 A1 Jul. 31, 2008

(30) Foreign Application Priority Data

Jan. 31, 2007 (JP) .................................. 2007-022237

(51) Int. Cl.
*G06F 11/00* (2006.01)

(52) U.S. Cl. ............................... 714/20; 714/26; 714/39

(58) Field of Classification Search .................... 714/20, 714/26, 39
See application file for complete search history.

(56) References Cited

U.S. PATENT DOCUMENTS

| | | | | |
|---|---|---|---|---|
| 6,380,951 | B1* | 4/2002 | Petchenkine et al. | 715/736 |
| 6,708,189 | B1* | 3/2004 | Fitzsimons et al. | 1/1 |
| 7,178,069 | B2* | 2/2007 | Hashimoto et al. | 714/47 |
| 7,386,586 | B1* | 6/2008 | Headley et al. | 709/202 |
| 7,679,764 | B2* | 3/2010 | Shima | 358/1.15 |
| 2002/0087602 | A1 | 7/2002 | Masuda et al. | |
| 2002/0091971 | A1* | 7/2002 | Sawada et al. | 714/46 |
| 2004/0194010 | A1 | 9/2004 | Kirihara et al. | |
| 2004/0252322 | A1* | 12/2004 | Gassho et al. | 358/1.14 |
| 2005/0052684 | A1* | 3/2005 | Ferlitsch | 358/1.15 |
| 2005/0073717 | A1* | 4/2005 | Arakawa | 358/1.15 |
| 2005/0102327 | A1 | 5/2005 | Manki et al. | |
| 2005/0105135 | A1* | 5/2005 | Takahashi | 358/1.18 |
| 2005/0134893 | A1* | 6/2005 | Han | 358/1.14 |
| 2005/0141014 | A1* | 6/2005 | Kikuchi et al. | 358/1.14 |
| 2006/0001901 | A1* | 1/2006 | Kidani et al. | 358/1.14 |
| 2006/0026121 | A1* | 2/2006 | Terao | 707/1 |
| 2006/0101304 | A1* | 5/2006 | Miura | 714/5 |
| 2006/0112147 | A1* | 5/2006 | Suenaga et al. | 707/200 |
| 2006/0248406 | A1* | 11/2006 | Qing et al. | 714/38 |
| 2006/0256360 | A1* | 11/2006 | Kayama | 358/1.13 |
| 2006/0279780 | A1* | 12/2006 | Anno et al. | 358/1.15 |

(Continued)

FOREIGN PATENT DOCUMENTS

JP 2000-118095 4/2000

(Continued)

OTHER PUBLICATIONS

Chinese Office Action dated Aug. 7, 2009 in Counterpart Application No. 200810009025.2.

(Continued)

*Primary Examiner* — Scott Baderman
*Assistant Examiner* — Loan Truong
(74) *Attorney, Agent, or Firm* — Fitzpatrick, Cella, Harper & Scinto

(57) ABSTRACT

An image forming apparatus includes a process execution unit which processes data input to a storage area by using the attribute of a process set in the storage area, an error event generation unit which generates an error event to execute an error process when an error is detected during execution of the process by the process execution unit, and an error process execution unit which executes an error process associated with the storage area in accordance with the error event generated by the error event generation unit.

15 Claims, 17 Drawing Sheets

U.S. PATENT DOCUMENTS

| | | | |
|---|---|---|---|
| 2007/0005561 A1* | 1/2007 | Sakura et al. | 707/1 |
| 2007/0038747 A1* | 2/2007 | Kishimoto et al. | 709/224 |
| 2007/0143354 A1* | 6/2007 | Morooka | 707/200 |
| 2007/0168761 A1* | 7/2007 | Baltes et al. | 714/51 |
| 2007/0192460 A1* | 8/2007 | Choi et al. | 709/223 |
| 2007/0240144 A1* | 10/2007 | Chen et al. | 717/168 |
| 2008/0209265 A1* | 8/2008 | Fuchikami | 714/8 |

FOREIGN PATENT DOCUMENTS

| | | |
|---|---|---|
| JP | 2000-311095 | 11/2000 |
| JP | 2004-287859 | 10/2004 |
| JP | 2004-287860 | 10/2004 |
| JP | 2005-115660 | 4/2005 |
| JP | 2005-148993 A | 6/2005 |
| JP | 2005-242661 | 9/2005 |
| JP | 2006-154938 A | 6/2006 |

OTHER PUBLICATIONS

Japanese Office Action dated Oct. 3, 2011 concerning Japanese Patent Application No. 2007-022237.

* cited by examiner

FIG. 12A  ERROR PROCESS SCRIPT FILE
12001 TRANSMIT ERROR INFORMATION TO ADMINISTRATOR :
12002 PRINT ERROR INFORMATION :

FIG. 12B  ERROR PROCESS SCRIPT FILE
12003 TRANSMIT ERROR INFORMATION TO ADMINISTRATOR :
IF (NG)
PRINT ERROR INFORMATION :

IMAGE FORMING APPARATUS, METHOD OF CONTROLLING IMAGE FORMING APPARATUS, PROGRAM, AND STORAGE MEDIUM

BACKGROUND OF THE INVENTION

1. Field of the Invention

The present invention relates to an image forming technology.

2. Description of the Related Art

An image forming apparatus is improving its functions and performance; it has, for example, a JAVA® platform, in addition to copy, print, FAX, and transmission (e-mail and file transfer) functions, and can execute an arbitrary application program. Representative examples of JAVA programs are OCR and document management which are usable as the functions of an image forming apparatus. Some image forming apparatuses incorporate a hard disk to enable a data process by various functions. Such an image forming apparatus can store and save data in folders created in the hard disk (BOX function).

On the other hand, in a print system using a personal computer, a hot folder is used to execute a print process preset in the folder for data input (drag & drop) to the specific folder.

Japanese Patent Laid-Open No. 2005-115660 discloses an arrangement which creates a hot folder with a print service attribute in a personal computer. When document information is input to the hot folder, a print request according to the print service attribute is sent to a server.

However, the above-described technique executes print settings for the hot folder created in the personal computer and inputs print data to a printer or print server, instead of forming a hot folder by setting the attribute of a process function such as data transmission, box saving, copy, or print unique to an image forming apparatus.

When a hot folder is formed in the hard disk to cause the image forming apparatus to execute a unique process function, processes (operations) that combine various kinds of preset process functions of the image forming apparatus are sequentially executed. In this case, if, for example, a print job is stopped halfway, how to associate an error process corresponding to each process of the image forming apparatus with the hot folder is an issue.

SUMMARY OF THE INVENTION

It is an object of the present invention to provide an image forming technique that allows to execute an error process associated with a process preset in a storage area that stores data generated by an image forming apparatus.

According to one aspect of the present invention, there is provided an image forming apparatus comprising:

a process execution unit adapted to process data input to a storage area by using an attribute of a process set in the storage area;

an error event generation unit adapted to generate an error event to execute an error process when an error is detected during execution of the process by the process execution unit; and an error process execution unit adapted to execute an error process associated with the storage area in accordance with the error event generated by the error event generation unit.

According to another aspect of the present invention, there is provided a method of controlling an image forming apparatus, comprising the steps of:

processing data input to a storage area by using an attribute of a process set in the storage area;

generating an error event to execute an error process when an error is detected during execution of the process in the process executing step; and executing an error process associated with the storage area in accordance with the error event generated in the error event generating step.

According to the present invention, it is possible to execute an error process associated with a process preset in a storage area that stores data generated by an image forming apparatus.

Further features of the present invention will become apparent from the following description of exemplary embodiments with reference to the attached drawings.

BRIEF DESCRIPTION OF THE DRAWINGS

FIG. 6 is a view for explaining detailed examples of error events and error process scripts;

DESCRIPTION OF THE EMBODIMENTS

Preferred embodiments of the present invention will be described below in detail with reference to the accompanying drawings. Constituent elements described in the embodiments are merely examples, and the scope of the present invention is determined by the claims and is not limited to the individual embodiments to be described below.

First Embodiment (Arrangement of Image Forming System)

Figure 1:
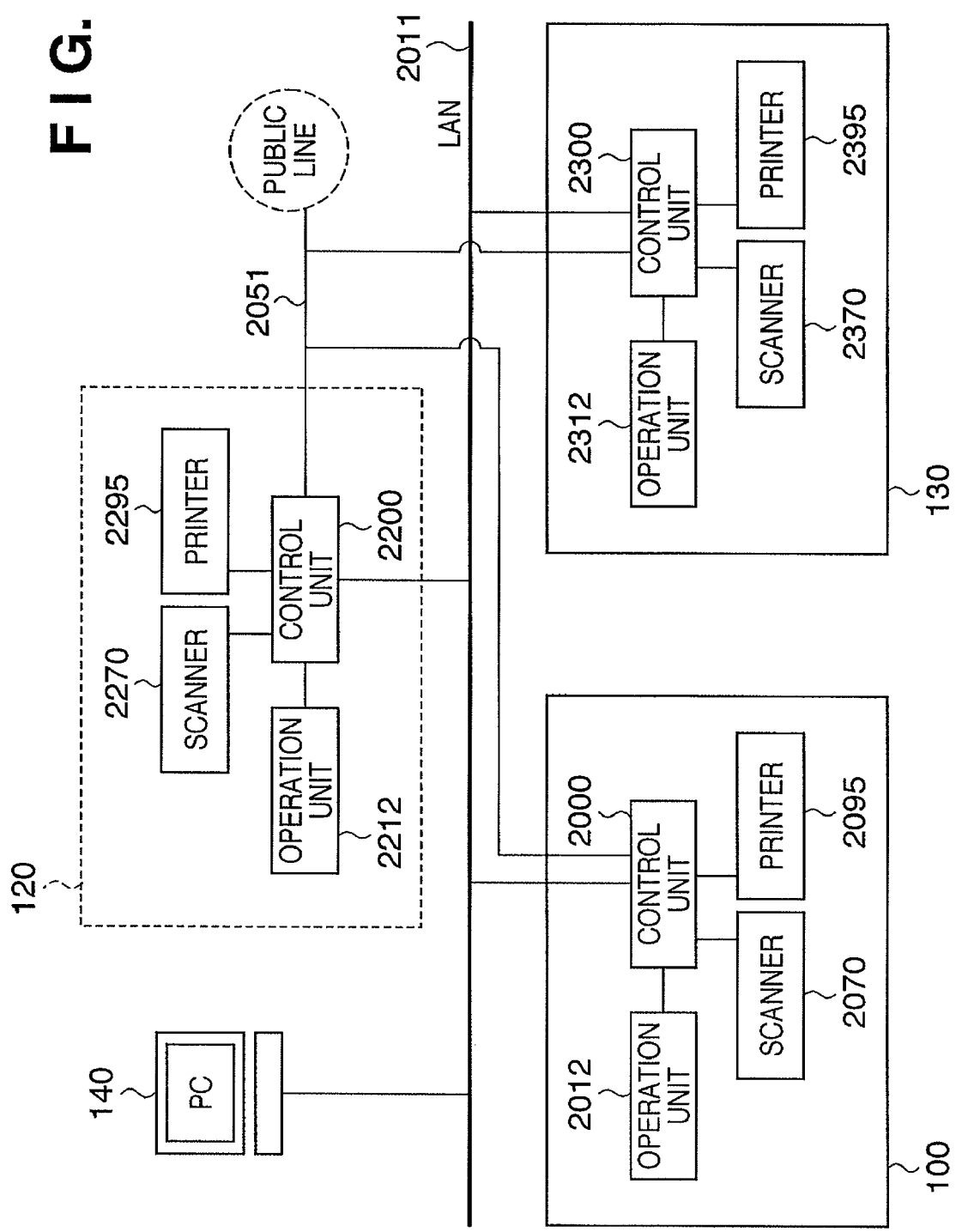
FIG. 1 is a block diagram for explaining the overall arrangement of an image forming system including an image forming apparatus according to an embodiment.

FIG. 1 is a block diagram for explaining the overall arrangement of an image forming system including an image forming apparatus according to an embodiment of the present invention. An image forming apparatus 100 according to this embodiment can communicate with an information processing apparatus 140 and other image forming apparatuses 120 and 130 via a network (for example, LAN 2011).

The image forming apparatus 100 includes a scanner 2070 serving as an image input device, a printer 2095 serving as an image output device, a control unit 2000 which controls the entire apparatus, and an operation unit 2012 serving as a user interface (UI).

The scanner 2070, printer 2095, and operation unit 2012 are connected to the control unit 2000. The control unit 2000 is connected to a network transmitting unit such as the LAN 2011 and a public line. The public line enables G3 or G4 FAX transmission including color image transmission. The other image forming apparatuses 120 and 130 having the same device structure as the image forming apparatus 100 are connected to the LAN 2011.

The information processing apparatus (to be referred to as a "PC" hereinafter) 140 is connected to the LAN 2011. The PC 140 can transmit/receive a file or e-mail using an FTP (File Transfer Protocol) or SMB (Server Message Block) protocol.

The image forming apparatuses 120 and 130 respectively have scanners 2270 and 2370, printers 2295 and 2395, and operation units 2212 and 2312 which are connected to control units 2200 and 2300, respectively, and controlled.

(Arrangement of Image Forming Apparatus)

Figure 2:
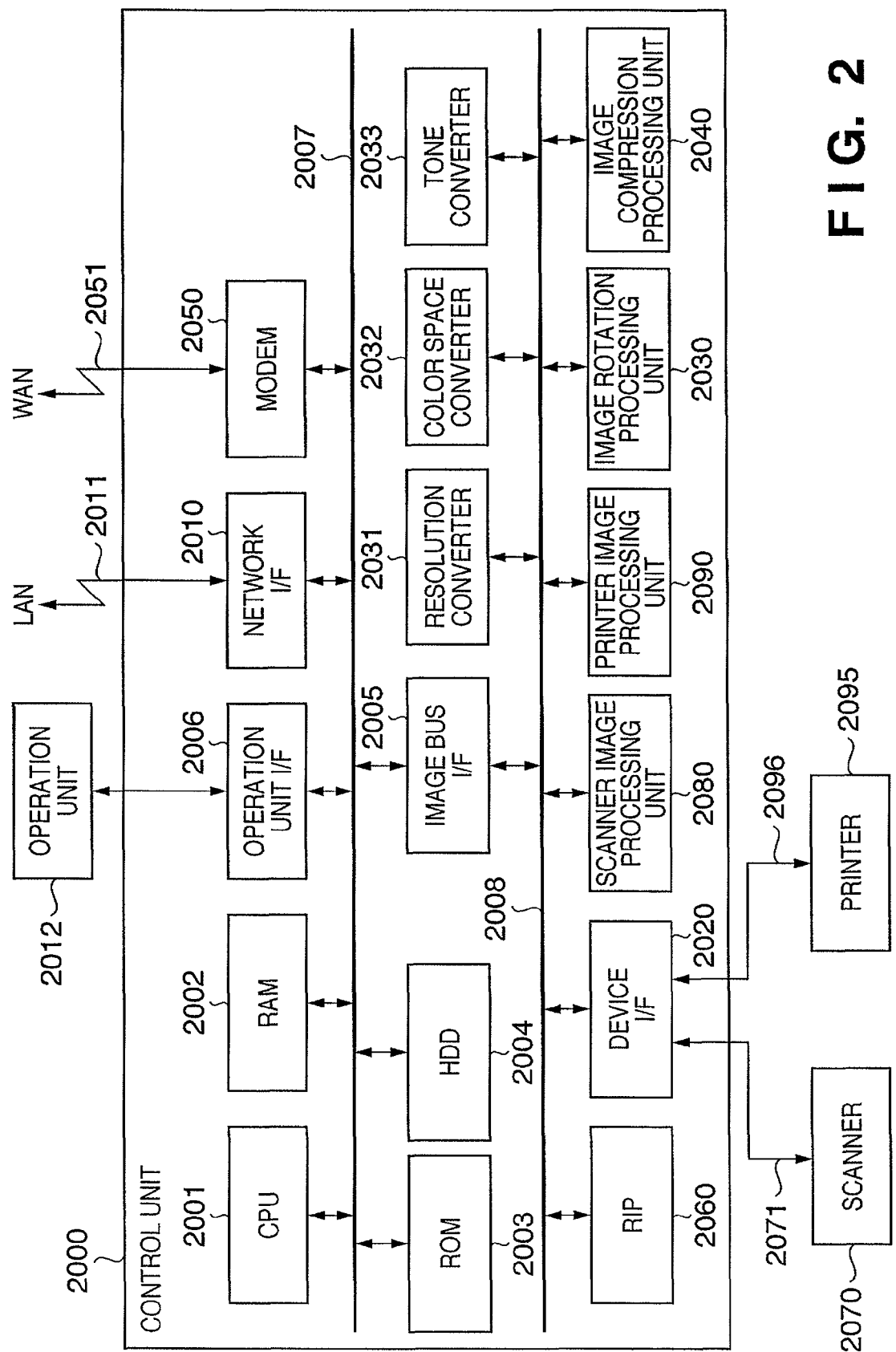
FIG. 2 is a block diagram for explaining the overall arrangement of the image forming apparatus.

FIG. 2 is a block diagram for explaining the arrangement of the image forming apparatus 100. The control unit 2000 is connected to the scanner 2070 serving as an image input device and the printer 2095 serving as an image output device via a device interface (I/F) 2020. On the other hand, the control unit 2000 is connected to the LAN 2011 via a network I/F 2010 and to a public line (WAN) via a modem 2050. The control unit 2000 can input/output image information or device information by communication via the device I/F 2020, network I/F 2010, or modem 2050.

A CPU 2001 is a controller that controls the entire system. A RAM 2002 serves as a system work memory for the operation of the CPU 2001 and also serves as an image memory to temporarily store image data. A ROM 2003 is a boot ROM which stores the boot program of the system.

An HDD 2004 is a hard disk drive that stores system software and image data. The data stored in the hard disk are not limited to these. For example, the hard disk can also store a general data file containing, for example, data for image management except image data. This is a function of the image forming apparatus 100 called BOX.

A folder can be created in the hard disk. A folder can store an image data file or general data file. A folder has an area only internally accessible by the image forming apparatus 100 and an area accessible by a user. A user can store, for example, image data in a folder in the user-accessible area. The folder in the user-accessible area will be described later with reference to FIG. 4.

An operation unit I/F 2006 is the interface unit of the operation unit 2012 and outputs, to the operation unit 2012, image data to be displayed on it.

The operation unit I/F 2006 also transmits information input from the operation unit 2012 by the system user (user) to the CPU 2001. The network I/F 2010 is connected to the LAN 2011 to input/output image information or device information.

The modem 2050 is connected to a public line (WAN) 2051 to input/output image information or device information.

The above-described devices are arranged on a system bus 2007.

An image bus I/F 2005 connects the system bus 2007 to an image bus 2008 that transfers image data at a high speed. The image bus I/F 2005 is a bus bridge capable of converting a data structure to enable data exchange between the side of the system bus 2007 and the side of the image bus 2008.

The image bus 2008 includes a PCI bus (Peripheral Component Interconnect bus) or a bus complying with IEEE1394. The following devices are arranged on the image bus 2008.

A raster image processor (RIP) 2060 rasterizes a PDL code into a bitmap image. The device I/F 2020 connects the scanner 2070 and printer 2095 serving as image input and output devices to the control unit 2000 so that conversion between a synchronous system and an asynchronous system can be done.

A scanner image processing unit 2080 can correct, manipulate, and edit input image data. The scanner image processing unit 2080 also has a function of determining on the basis of the color saturation signal of an input image whether the image is color or monochrome and holding the result. A printer image processing unit 2090 can correct, manipulate, and edit output image data.

In cooperation with the scanner image processing unit 2080, an image rotation processing unit 2030 can rotate an image and store it on a memory simultaneously with image read by the scanner 2070. The image rotation processing unit 2030 can also rotate an image on a memory and store it on the memory, or print an image on a memory while rotating it in cooperation with the printer image processing unit 2090.

A resolution converter 2031 can execute resolution conversion of an image on a memory and store the image on the memory. A color space converter 2032 can convert, for example, a YUV image on a memory into a Lab image by a matrix operation and store the image on the memory.

A tone converter 2033 can convert, for example, an 8-bit 256-tone image on a memory into a 1-bit, 2-tone image by a method such as error-diffusion processing and store the image on the memory. An image compression processing unit 2040 can execute JPEG for multivalued image data or compression/expansion processing such as JBIG, MMR, MR, or MH for binary image data. The image rotation processing unit 2030, resolution converter 2031, color space converter 2032, tone converter 2033, and image compression processing unit 2040 can operate cooperatively. For example, rotation and resolution conversion of an image on a memory can be done without intervening the memory.

Figure 3:
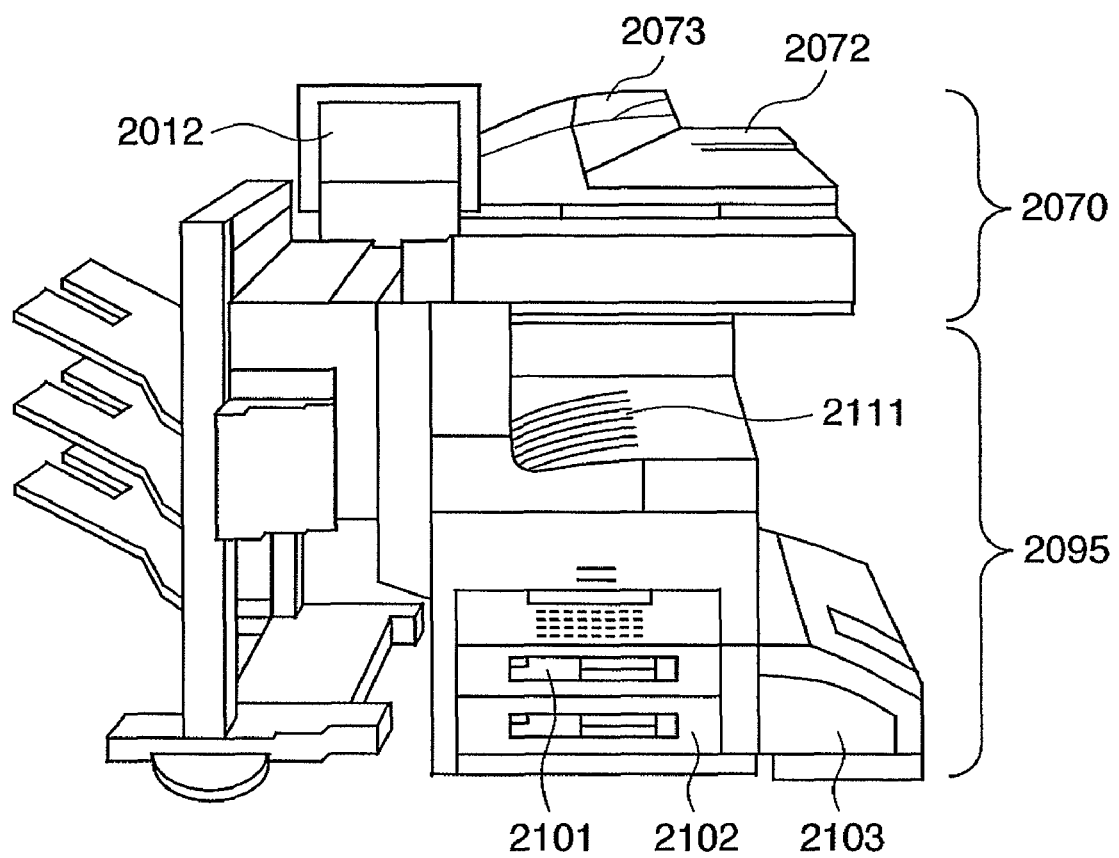
FIG. 3 is a view showing the outer appearance of the image forming apparatus.

FIG. 3 is a view showing the outer appearance of the image forming apparatus 100. The scanner 2070 serving as an image input device illuminates an image on a document sheet and scans a CCD line sensor (not shown), thereby converting image data into an electrical signal as raster image data 2071. Document sheets are set on a tray 2073 of a document feeder 2072. When the user inputs a read start instruction from the operation unit 2012, the CPU 2001 supplies the instruction to the scanner 2070. Upon receiving the instruction, the document feeder 2072 of the scanner 2070 feeds the documents sheets one by one so that the document read operation is executed.

The printer 2095 serving as an image output device forms an image on a printing medium (paper sheet) on the basis of raster image data 2096. The image forming method can be either an electrophotographic method using a photosensitive drum or an inkjet method of discharging ink from a tiny nozzle array and directly forming an image on a paper sheet. The image forming operation starts in accordance with the instruction 2096 from the CPU 2001. The printer 2095 has a plurality of feed stages to select different paper sizes or different paper orientations, and paper cassettes 2101, 2102, and 2103 corresponding to the feed stages. A discharge tray 2111 receives printed paper sheets.

(Description of Folder)

Figure 4:
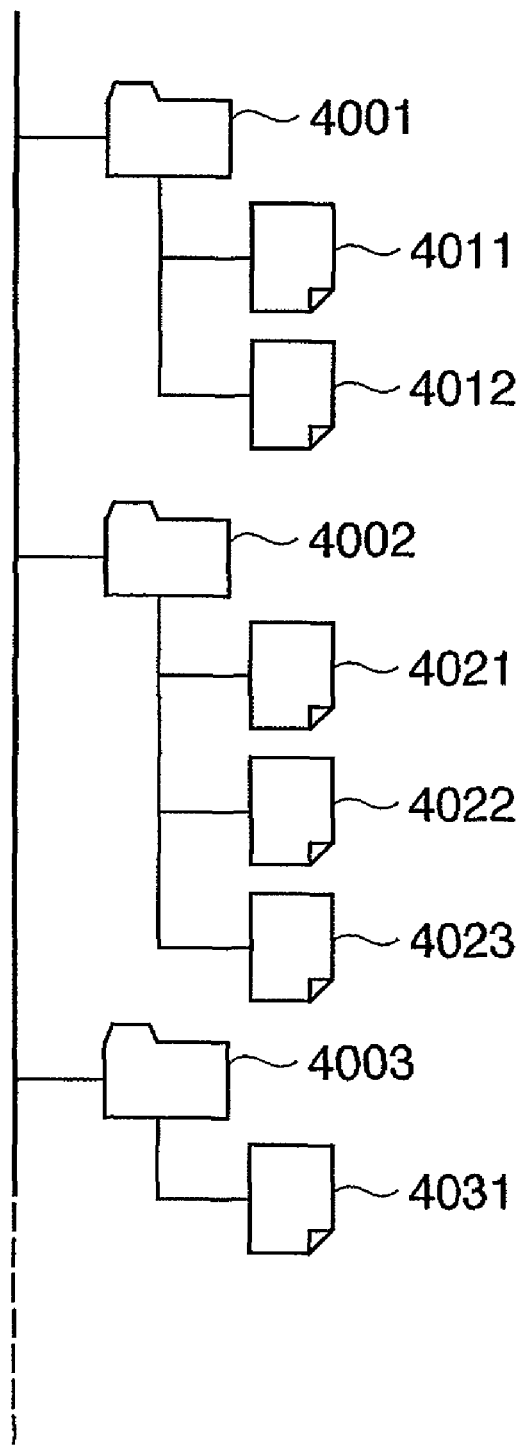
FIG. 4 is a view showing an example of folders provided in a user-accessible area.

FIG. 4 is a view showing an example of folders provided in the user-accessible area. FIG. 4 shows three folders 4001, 4002, and 4003. The folder 4001 stores data 4011 and 4012. The folder 4002 stores data 4021, 4022, and 4023. The folder 4003 stores data 4031. These folders are managed by the BOX function of the image forming apparatus. When the image forming apparatus has a JAVA platform, document management software as a JAVA application can also manage the folders.

The number of data stored in each folder is merely an example, and the present invention is not limited to the numbers of data shown in FIG. 4. The folders in the user-accessible area may have a hierarchical structure.

Image data read by the scanner 2070 can be stored in a folder designated by the user. Alternatively, image data generated by using a printer driver in a client machine such as the PC 140 connected to the image forming apparatus 100 can be stored in a folder designated by the user.

Image data or the like can also be stored by causing the client machine to directly access a folder using an FTP, SMB, or WebDAV (Distributed Authoring and Versioning) protocol.

(Description of Hot Folder)

A hot folder will be described next. A hot folder according to this embodiment is a folder formed in the image forming apparatus 100 as a storage area that stores data and executes a process (also referred to as an "operation" hereinafter) preset in the folder for the data stored in the folder. The process (operation) preset in the hot folder is executed in accordance with occurrence of an event preset in the hot folder. When, for example, a document file or print data file is input to the hot folder, the hot folder executes an operation for the input file. It is possible to set the hot folder function in each folder (BOX) described in FIG. 4, which saves and stores files. In this case, when a document file is saved in a folder (BOX), the folder also executes a process as a hot folder.

The image forming apparatus 100 according to this embodiment can generate, for input data, data to be processed by the image forming apparatus 100 in accordance with an attribute (operation contents) set in the hot folder. The image forming apparatus 100 can also transmit a data processing result in it to another image forming apparatus 120 or 130 via a network so that the image forming apparatus processes the data in accordance with a set attribute (operation contents).

When data is input to the hot folder (storage area), the CPU 2001 and hot folder can form a process execution unit capable of processing the data by using the attribute of a process associated with the hot folder (storage area).

The process (operation) preset in the hot folder indicates a process for executing a function unique to the image forming apparatus 100. Examples of the process are "document (including data and file) printing", "FAX transmission", "document transmission to external device using SMB or e-mail", and "document editing".

Examples of document editing are "document copy", "document movement", "document deletion", "merging with another document", "deletion of document from merged document", and "page deletion". Examples of document editing also include "text generation by OCR (optical character recognition)" and "format (image format) conversion".

Examples of events set in a folder are "document input (storage in folder)", "elapse of predetermined time from document input", "arrival of set time", and "timing of user's login to image forming apparatus". Additionally, "timing of document status change" or "timing of document printing execution" can be set in a folder as an event.

The above-described processes (operations) and events are merely examples, and the present invention is not limited to these.

(Registration of Hot Folder Setting File)

Figure 17:
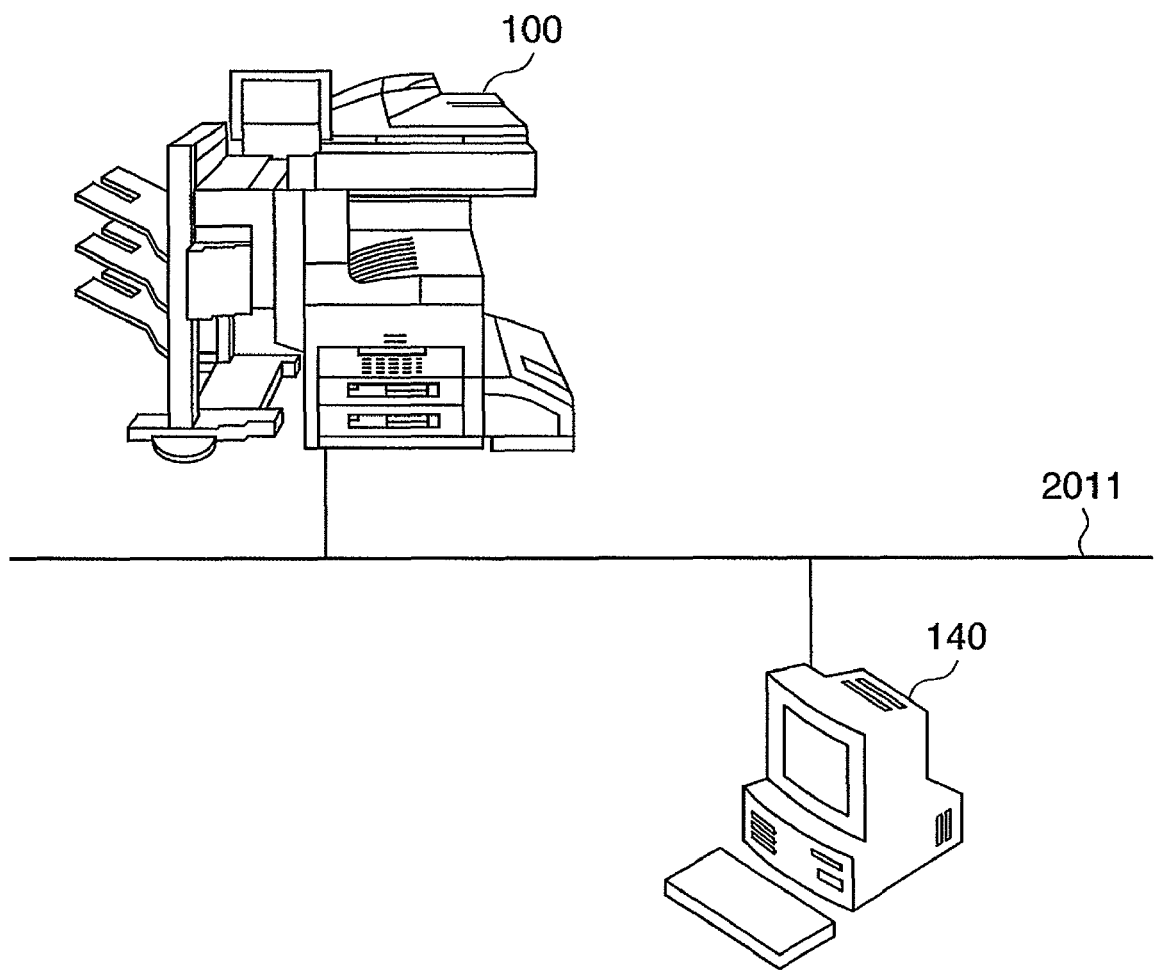
FIG. 17 is a view for explaining registration of a hot folder setting file.

A method of registering a hot folder setting file will be described with reference to FIG. 17. The image forming apparatus 100 and PC 140 are connected to the LAN 2011.

In the PC 140, a hot folder setting file is created. The user can create the hot folder setting file by, for example, describing it in accordance with a predetermined format or using a hot folder setting generation application. An example of the format of the hot folder setting file will be described later with reference to FIGS. 7A to 7C.

The PC 140 notifies the image forming apparatus 100 via the LAN 2011 that the hot folder setting file will be transmitted. The image forming apparatus 100 receives the notification and, if reception of the hot folder setting file is possible, notifies the PC 140 of the reception enable state.

In accordance with the reception enable state notification from the image forming apparatus 100, the PC 140 transmits the hot folder setting file to the image forming apparatus 100.

On the other hand, upon receiving a hot folder setting file reception disable state notification or no reception disable state notification from the image forming apparatus 100, the PC 140 stops hot folder setting file transmission. Upon receiving a hot folder setting file reception enable state notification later from the image forming apparatus 100, the PC 140 that stopped transmitting the hot folder setting file can start transmitting it.

The PC 140 transmits the hot folder setting file to a folder (a BOX of the image forming apparatus) serving as a hot folder. For file transmission, a protocol such as WebDAV or FTP that can transmit a file on the LAN 2011 is usable.

The PC 140 notifies the image forming apparatus 100 of hot folder setting file transmission in advance. For this reason, the image forming apparatus 100 already knows that the client computer is scheduled to transmit the hot folder setting file. Upon receiving the hot folder setting file, the image forming apparatus 100 can execute a process of making it invisible. In this case, the hot folder setting file is saved in the hot folder as a hidden file. This limits access to the hot folder setting file except when it is to be edited or updated.

The hot folder setting file can be generated not only by the PC 140 but also by the image forming apparatus 100. The hot folder setting file transmission protocols are merely examples, and any other protocols having the same fiction are applicable.

When an event occurs as a document file is input to the hot folder of the image forming apparatus 100, a process (operation) preset in the hot folder is executed under the control of the CPU 2001. If a plurality of processes (operations) are set, the set processes are sequentially executed under the control of the CPU 2001.

(Detailed Operation of Hot Folder)

Figure 5:
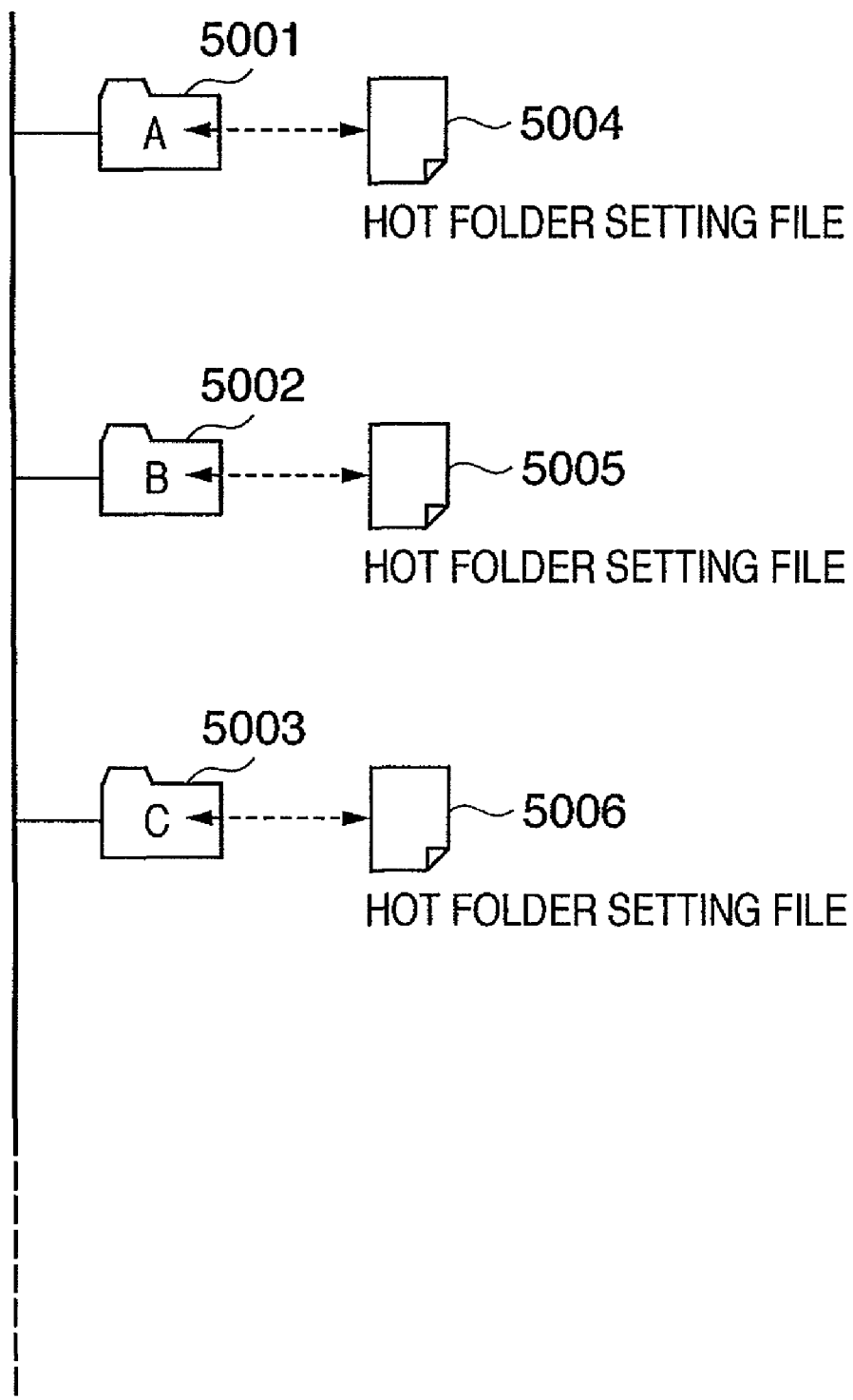
FIG. 5 is a view for explaining a detailed operation of a hot folder.

A detailed example of the operation of the hot folder will be described with reference to FIG. 5. Assume that a hot folder A

5001 has a hot folder setting file 5004 which describes operation "document printing" to be executed when an event "document input" occurs.

Figure 7A:
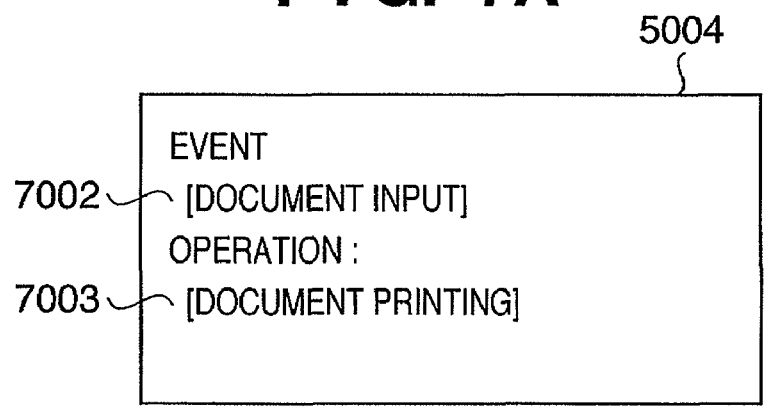
FIGS. 7A to 7C are views showing the formats of hot folder setting files.

FIG. 7A is a view showing the format of the hot folder setting file. The hot folder setting file 5004 includes an event specifying portion 7002 which specifies an event for operation start, and an operation specifying portion 7003 which specifies an operation to start in accordance with the occurrence of an event.

In the hot folder setting file 5004, "document input" is described in the event specifying portion 7002, and "document printing" is described in the operation specifying portion 7003.

When the user stores a document (data) in the hot folder A 5001, a document input event occurs. The "document printing" operation described in the operation specifying portion 7003 is executed for the stored document (data).

If no corresponding operation is described in the operation specifying portion 7003 upon occurrence of an event, process execution can be inhibited. Alternatively, a predetermined default operation may be executed.

FIG. 7A shows an example of the description of the hot folder setting file, and the present invention is not limited to this expression. For example, XML or other expression method can be used to describe a hot folder setting file. In the hot folder setting file 5004, the single operation "document printing" is executed in correspondence with the single event "document input". The hot folder setting file can also describe, in the operation specifying portion, a plurality of operations to be executed in correspondence with one event.

Figure 7B:
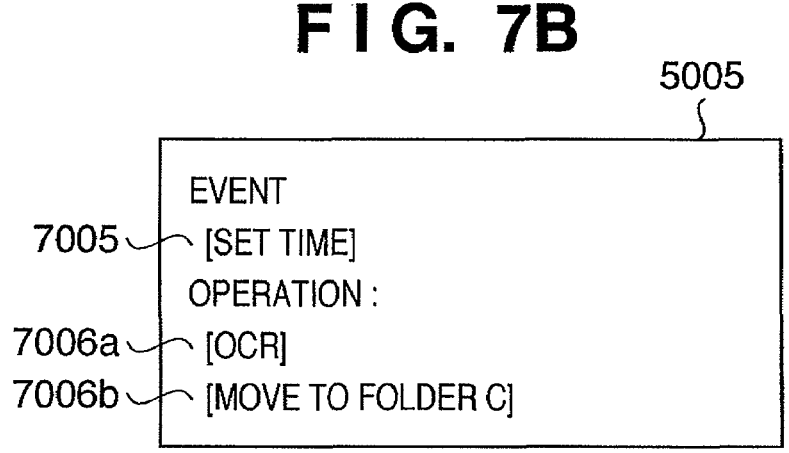

For example, FIG. 7B shows a hot folder setting file 5005 in a hot folder B 5002. An event specifying portion 7005 of the hot folder setting file 5005 describes "set time (for example, 22:00)". The operation specifying portion describes "OCR" 7006a and "move to folder C" 7006b.

A timer (not shown) measures time, and when the "set time 22:00" comes, an event occurs. When an event occurs, the "OCR" 7006a is executed, and then, the operation "move the read document (data) to folder C" 7006b is executed. That is, the hot folder setting file can be described such that a plurality of operations are described in the order described in correspondence with one event.

In the above-described hot folder A 5001, the application target of the event "document input" is only an input document (data). On the other hand, in the hot folder B 5002, the event "set time" is applied to all documents (data) that exist in the hot folder B 5002. That is, events are classified into a type that is applied to only one document (data) and a type that is applied to all documents (data) in a hot folder.

Filtering can be done to select a document (data) as the application target of an operation to be executed in correspondence with an event that has occurred. The mechanism of filtering is as follows. For example, the history of operation executions is saved. A document (data) which has undergone an operation at least once is excluded. Alternatively, filtering may be executed to perform an operation in accordance with the attribute of a document (data).

When the operation "OCR" 7006a in FIG. 7B is executed, the read document (data) is moved to (stored in) a hot folder C 5003 with a hot folder setting file 5006.

Figure 7C:
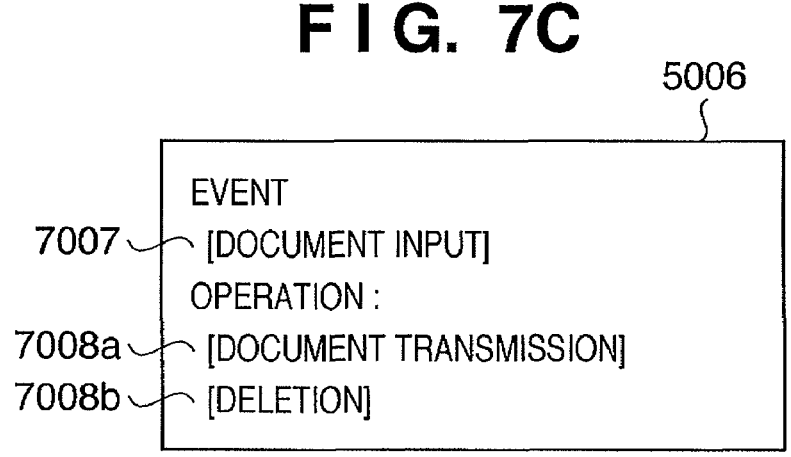

The hot folder setting file 5006 has settings shown in FIG. 7C. The event specifying portion describes "document input" 7007. The operation specifying portion describes "document transmission" 7008a and "delete" 7008b. When "move to folder C" 7006b in FIG. 7B is executed, the document (data) read by "OCR" is moved to (stored in) the hot folder C 5003. At this time, the event "document input" 7007 described in the event specifying portion in FIG. 7C occurs. In correspondence with this event, "document transmissions" is executed for a destination designated in advance. After that, the document (data) is deleted.

As described above, when "document movement" to another folder or "document copy" is set in a hot folder, the operations can be executed by cooperation among a plurality of hot folders.

(Process Executed when Error Occurs During Operation Execution)

A case wherein an error occurs during operation execution will be described next. The "error" indicates, for example, a state wherein operation execution does not normally finish or a state wherein processes described in the event specifying portion and operation specifying portion do not normally finish because of a setting error in a hot folder. The CPU 2001 of the image forming apparatus 100 monitors event occurrence and operation execution. An error can be detected on the basis of the monitoring result.

A special event that occurs in case of an error is an "terror event". There are two kinds of error events: "system error events" generated by the system of the image forming apparatus 100 and "user error events" generated in correspondence with, for example, operation execution on the basis of the description of a hot folder setting file.

An event name can be set for a user error event. A plurality of user error events can occur in correspondence with one operation. A description that specifies the contents of an error process to be started and executed in correspondence with an error event is called an "error process script". An error process script file can be registered in a hot folder.

In registering an error process script file, what kind of error event should start the error process, a system error event or user error event can be set. For a user error event, the name of the event for which the error process should start can be set in advance.

It is also possible to register a default error process script file. The default error process script file is activated when an error occurs, and no corresponding to error process script file exists. An error process script file itself can cause an error. The registered default error process script file can cope with such a case.

The method of registering an error process script file is the same as the above-described hot folder setting file registration method. However, for an error process script file, it is necessary to simultaneously set, at the time of registration, the error event for which the error process should start. The error process script file can also be saved in a hot folder as a hidden file, like a hot folder setting file.

(Detailed Example of Error Process Script File)

FIG. 6 is a view for explaining detailed examples of error events and error process scripts. A hot folder 6001 has a hot folder setting file 6002. An error process script file SE 6004 and error process script file E 6003 are registered in the hot folder 6001. The error process script file SE 6004 corresponds to a system error event se. The error process script file E 6003 corresponds to a user error event e.

When the user error event or system error event described in the hot folder setting file occurs, the contents of an error process in the error process script file registered in correspondence with each error event are executed.

In this embodiment, an error process (an error process script file) to be executed is associated with occurrence of one error event. Instead, an error process script file may be associated with occurrence of a plurality of error events.

Figure 8A:
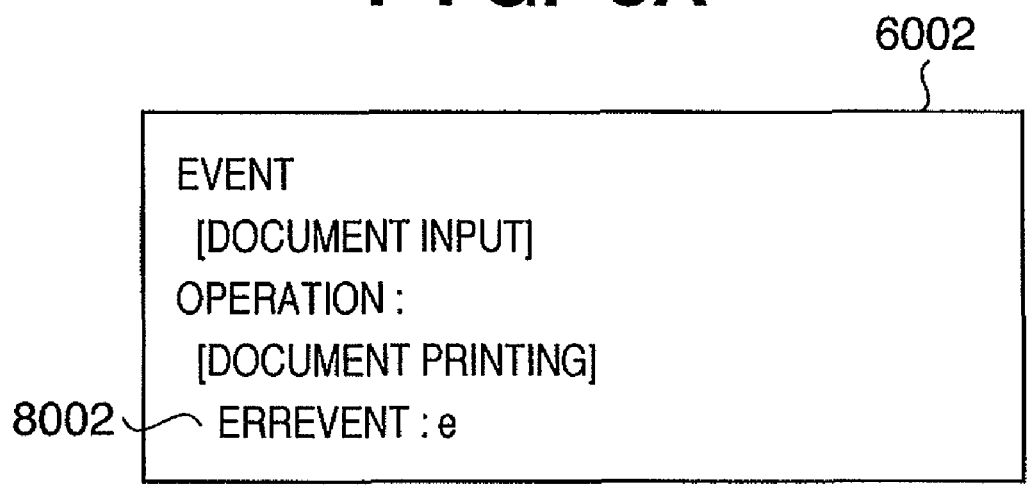
FIGS. 8A and 8B are views for explaining detailed examples of user error events.
Figure 8B:
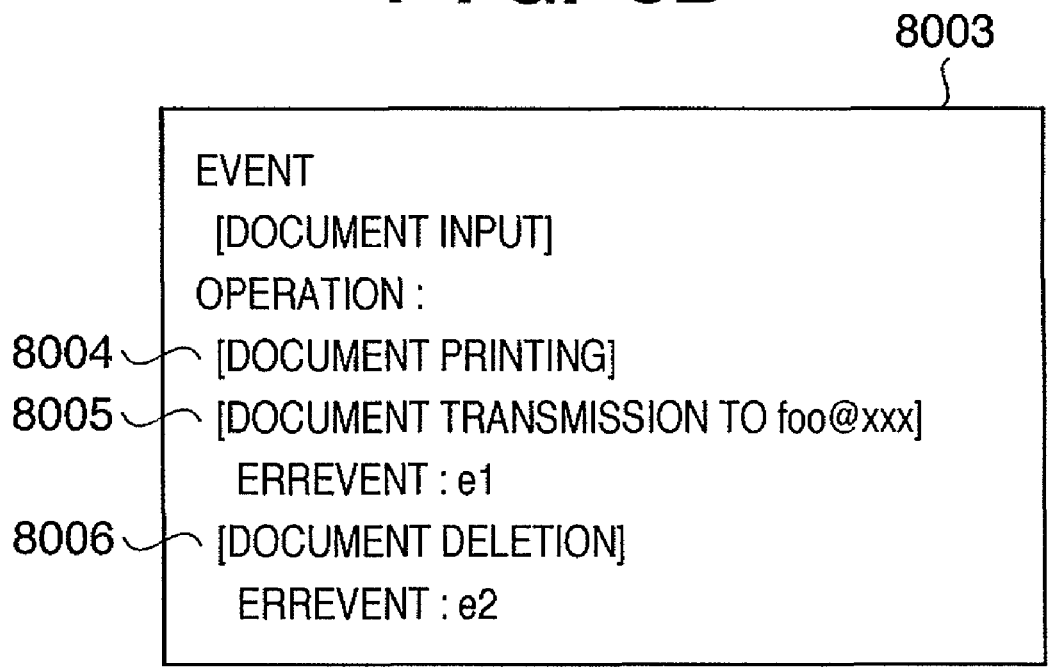

FIGS. 8A and 8B are views for explaining detailed examples of user error events. FIG. 8A shows a description example of the hot folder setting file 6002. "Document printing" is executed as an operation corresponding to the event "document input". Reference numeral 8002 represents setting of the user error event. When an error occurs during execution of the operation ("document printing") described in the operation specifying portion, a user error event with the name described in the user error event specifying portion ("ERREVENT") occurs.

In this example, when an error occurs during the operation "document printing", the user error event "e" occurs. Note that the user error event can occur for each operation.

In a hot folder setting file 8003 shown in FIG. 8B, when the event "document input" occurs, "document printing" 8004, "document transmission to designated destination (foo@xxx)" 8005, and "document deletion" 8006 are executed in order. User error events e1 and e2 are described for the operations "document transmission to designated destination (foo@xxx)" 8005 and "document deletion" 8006, respectively. If an error occurs during execution of the operations "document transmission" 8005 and "document deletion" 8006, the user error events e1 and e2 occur.

No user error event is described for the operation "document printing" 8004. If an error occurs during document printing, a system error event occurs.

Like the user error event, a system error event corresponding to an operation can be set in the hot folder setting file. When a user error event or system error event occurs, an error process with registered contents is executed.

(Process of Error Event)

Figure 9:
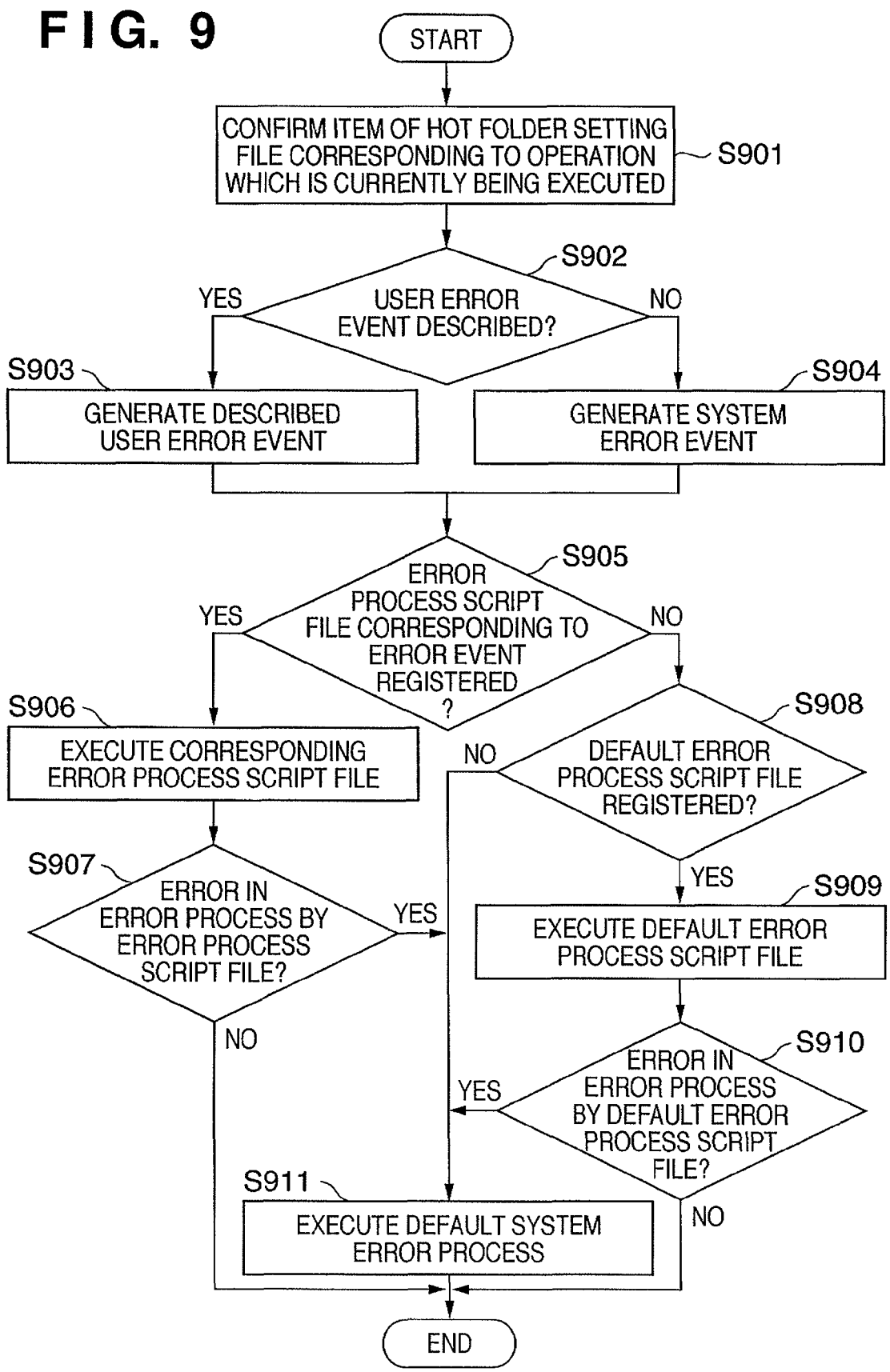
FIG. 9 is a flowchart for explaining the sequence of a process of an error event that occurs during operation execution.

FIG. 9 is a flowchart for explaining the sequence of a process of an error event that occurs during operation execution. This process is executed under the overall control of the CPU 2001 of the image forming apparatus 100. The CPU 2001 monitors whether an operation described in a hot folder setting file is normally executed. If the operation does not normally terminate, the CPU 2001 detects an error. In accordance with detection of an error, the CPU 2001 executes the error event process.

In step S901, an item (whether an error process script that generates an error event to execute an error process is set) of a hot folder setting file corresponding to an operation that is currently being executed is confirmed.

In step S902, it is determined whether a user error event based on user settings for generating an error event corresponding to an operation (process attribute) is described. If a user error event is described (YES in step S902), the process advances to step S903. In step S903, the user error event based on the user settings described in the hot folder setting file is generated, and the process advances to step S905.

If no user error event is described (NO in step S902), the process advances to step S904. In step S904, a system error event by default settings is generated, and the process advances to step S905.

In step S905, it is determined whether an error process script file that specifies an error process to be executed in correspondence with the generated error event is registered in the hot folder. If an error process script file is registered in the hot folder (YES in step S905), the process advances to step S906. If no error process script file is registered (NO in step S905), the process advances to step S908.

The CPU 2001 can associate an error event with an error process script file. The CPU 2001 can execute an error process associated with a hot folder in accordance with a generated error event.

In step S906, the error process based on the corresponding error process script file is executed. In step S907, it is determined whether an error has occurred in the error process executed in step S906 on the basis of the error process script. If no error has occurred (NO in step S907), the error process finishes, and the process is ended.

If it is determined in step S907 that an error has occurred (YES in step S907), the process advances to step S911. In step S911, a default system error process is executed as a final error process.

When no error process script file corresponding to the generated error event is registered (NO in step S905), it is confirmed in step S908 whether a default error process script file is registered in the folder. If it is determined in step S908 that no default error process script file is registered (NO in step S908), the process advances to step S911 to execute a default system error process as a final error process.

If it is determined in step S908 that a default error process script file is registered (YES in step S908), the process advances to step S909.

In step S909, an error process based on the default error process script file is executed. In step S910, it is determined whether an error has occurred in the error process executed in step S909 on the basis of the default error process script file. If no error has occurred (NO in step S910), the error process finishes, and the process is ended.

If it is determined in step S910 that an error has occurred (YES in step S910), the process advances to step S911. In step S911, a default system error process is executed as a final error process.

The error process also includes error occurrence notifications such as "notify the registered administrator of occurrence of an error by e-mail", "print error information", and "display occurrence of an error on the operation unit 2012".

When a plurality of hot folders execute operations in cooperation with each other, the CPU 2001 can determine a hot folder where an error process should be executed. The CPU 2001 decides a hot folder to execute an error process on the basis of the presence/absence of description of a user error event, the presence/absence of registration of an error process script file, and the presence/absence of registration of a default error process script file. For example, an error process can be executed on the side of a hot folder where an error has occurred. Alternatively, the error process can be returned to the document data input source. Note that the error process is not limited to the above-described example. For example, a described user error event may be generated or an error process based on an error process script file may be executed in each of the hot folders.

(Description of Error Process Script File)

Figure 10:
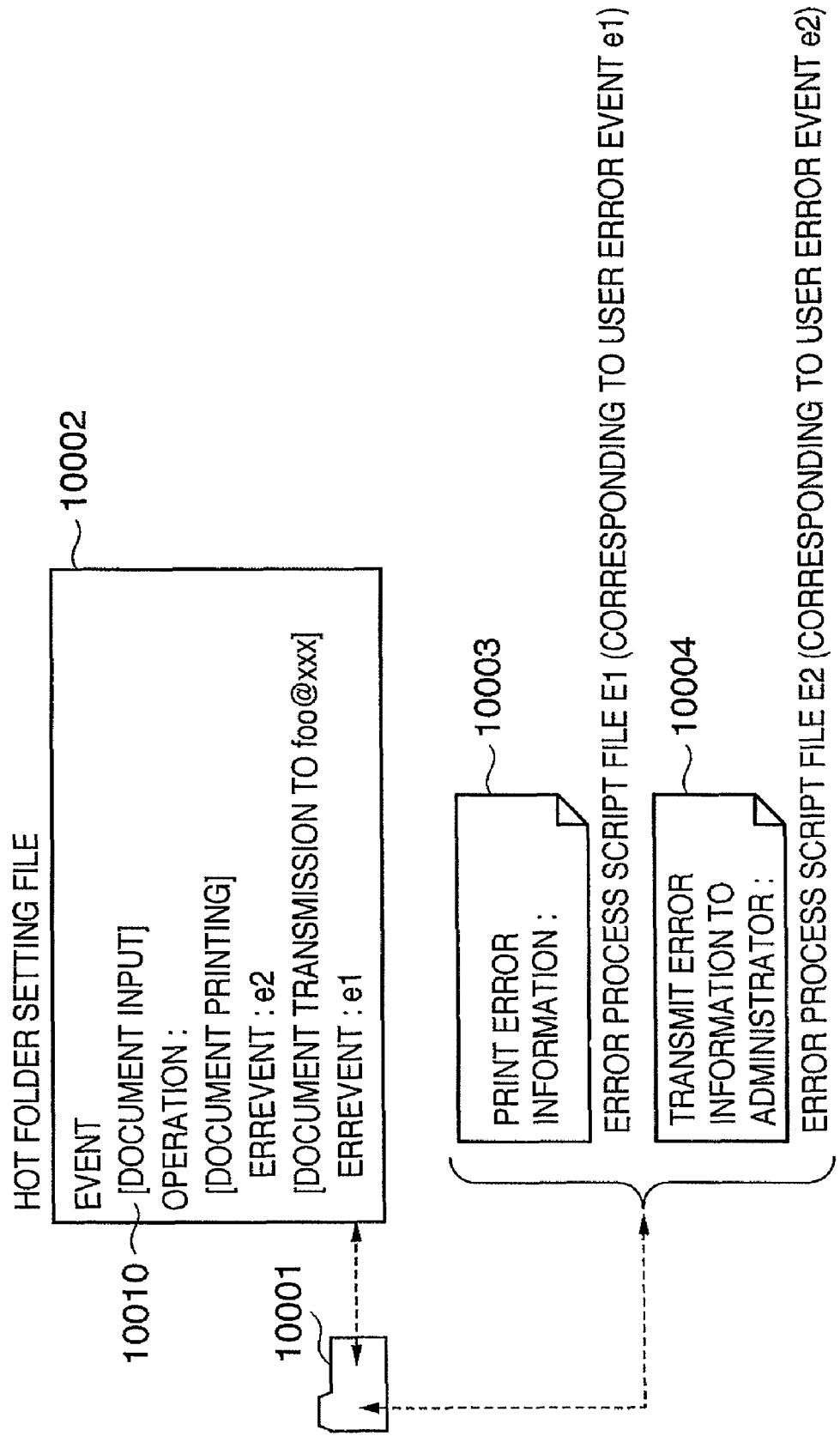
FIG. 10 is a view for explaining details of an error process script.

The error process script file will be described next in detail. FIG. 10 is a view for explaining details of an error process script. Assume that the contents of a hot folder setting file 10002 are set in a hot folder 10001.

Additionally, an error process script file E1 (10003) corresponding to the user error event e1 and an error process script file E2 (10004) corresponding to the user error event e2 are registered in the hot folder 10001.

The error process script file E1 (10003) describes an error process "print error information" when the error of the user error event e1 occurs. When the error of the user error event e1 occurs, the CPU 2001 executes the error process (the process of printing error information) described by the error process script file E1 (10003).

The error process script file E2 (10004) describes an error process "notify the administrator of error information by e-mail" when the error of the user error event e2 occurs. When the error of the user error event e2 occurs, the CPU 2001 executes the error process (the process of notifying the administrator of error information by e-mail) described by the error process script file E2 (10004).

The event specifying portion of the hot folder setting file 10002 describes [document input]. The operation specifying portion describes [document printing] and [document transmission to designated destination (foo@xxx)].

When document data is stored in the hot folder 10001, the [document input] event occurs, and the operations [document printing] and [document transmission to designated destination (foo@xxx)] are sequentially executed. In this example, "e2" is described as a user error event corresponding to [document printing], and "e1" is described as a user error event corresponding to [document transmission to designated destination (foo@xxx)].

When an error occurs during execution of the operation "document printing", the error process of transmitting error information to the administrator is executed. When an error occurs during execution of the operation "document transmission to designated destination (foo@xxx)", the error process of printing error information is executed.

Figure 11:
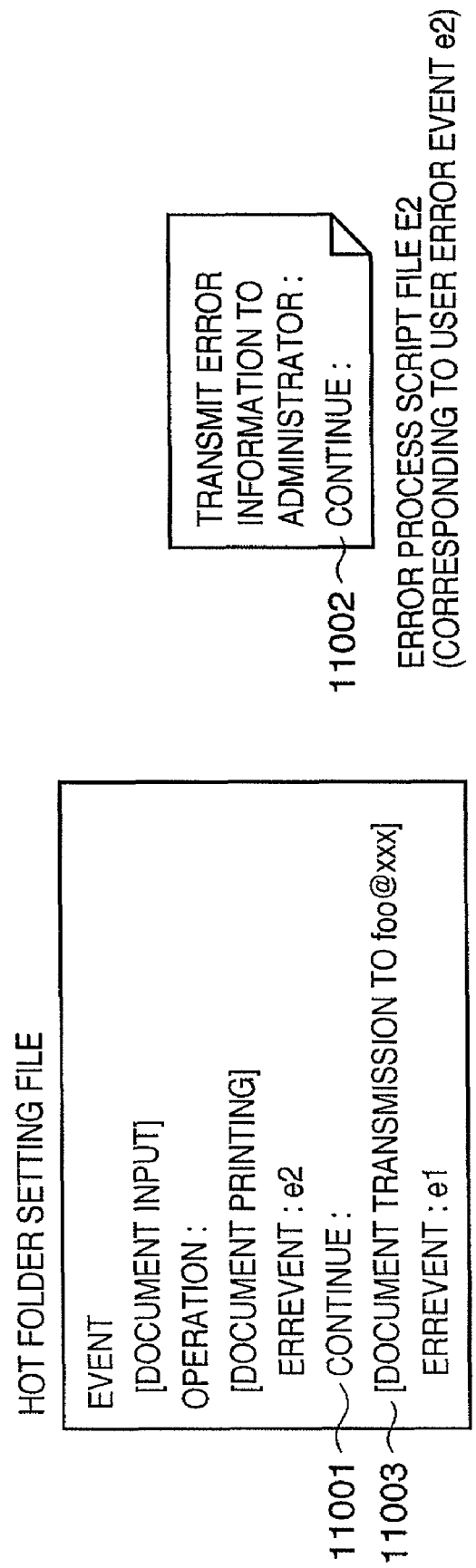
FIGS. 11A and 11B are views showing the description of a hot folder setting file.

FIGS. 11A and 11B are views showing the description of a hot folder setting file. This hot folder setting file is different from the hot folder setting file 10002 described in FIG. 10 in that a continue command ("CONTINUE:") 11001 (FIG. 11A) is described in a line following the user error event "e2". Even when an error occurs, the description of the continue command ("CONTINUE:") 11001 allows to continuously execute the operation described next after an error process. In the example shown in FIG. 11A, when an error occurs during execution of the document printing operation, the administrator is notified of error information by the user error event e2. After that, "document data transmission to a designated destination" 11003 is performed as the operation described next.

The continue command enables to link an error process with another operation executed after it.

The continue command can be described not on the hot folder setting file side but on, for example, the error process script file side (11002 in FIG. 11B).

Figure 12:
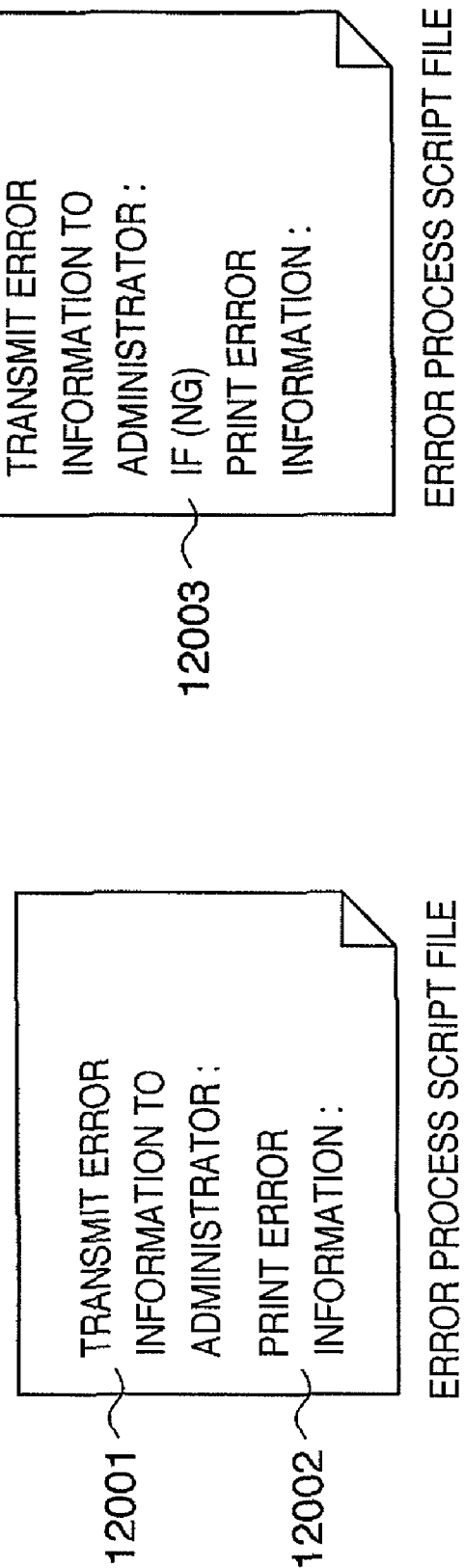
FIGS. 12A and 12B are views showing the descriptions of error process script files.

An error process script file can describe a plurality of error processes, as shown in FIGS. 12A and 12B. In FIG. 12A, when an error event occurs, an error process 12001 of "transmitting error information to administrator" and an error process 12002 of "printing error information" are executed. It is also possible to control (switch) error process execution by describing, using a conditional expression, a substitutive error process for an error process that could not be executed. In FIG. 12B, if the process of "transmitting error information to administrator" is attempted, and the error information cannot be transmitted, the error process to be executed can be controlled (switched) to "print error information" by (conditional expression (IF(NG))) 12003.

In this embodiment, the hot folder setting file and error process script file are saved in the hot folder as hidden files. However, the present invention is not limited to this.

For example, the hot folder setting file or error process script file can also be stored in a storage area except a hot folder (for example, the hard disk (HDD) 2004 of the image forming apparatus 100). In this case, the CPU 2001 of the image forming apparatus stores the hot folder, hot folder setting file, and error process script file in association with each other. When an event, or a user error event or system error event occurs, the CPU 2001 reads out the hot folder setting file or error process script file and executes each process.

According to this embodiment, it is possible to execute an error process associated with a process preset in a storage area that stores data generated by an image forming apparatus.

That is, according to this embodiment, it is possible to execute an error process associated with the process of a hot folder.

Second Embodiment

An embodiment related to error processes executed cooperatively by a plurality of hot folders will be described next.

Figure 13:
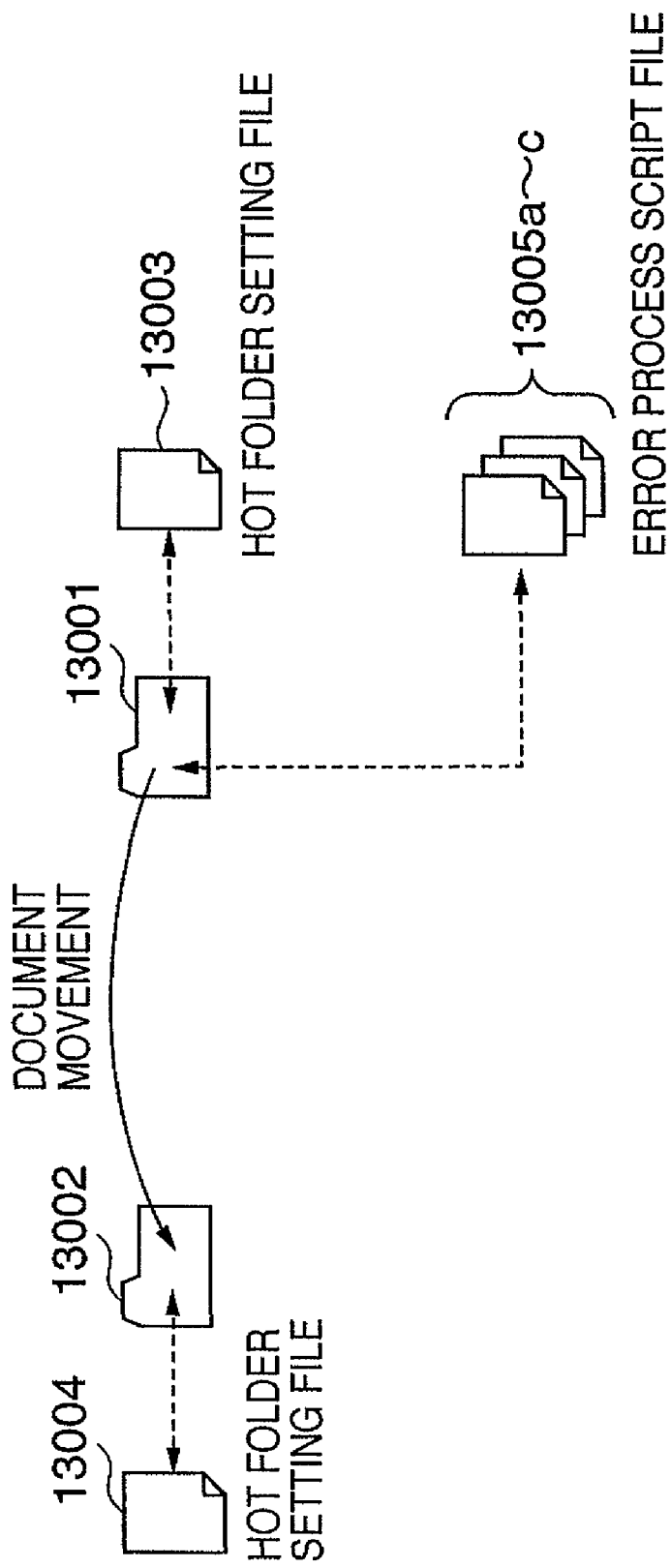
FIG. 13 is a view for explaining error processes executed cooperatively by hot folders 13001 and 13002.

FIG. 13 is a view for explaining error processes executed cooperatively by hot folders 13001 and 13002.

The hot folder 13001 has a hot folder setting file 13003. A plurality of error process script files 13005a to 13005c are registered in the hot folder 13001. On the other hand, the hot folder 13002 has a hot folder setting file 13004 but no registered error process script file.

The hot folder setting file 13003 describes a process (document movement process) of moving (storing) a document (data) processed by operation execution from the hot folder 13001 to the hot folder 13002.

The hot folder setting file 13004 describes an operation that starts in accordance with a document input (storage) event. When a document (data) is stored from the hot folder 13001 in the hot folder 13002, a document input (storage) event occurs. The operation that starts in accordance with the document input (storage) event is executed.

If an error occurs during execution of the operation of the hot folder setting file 13004, no error process script file is described in the hot folder 13002.

For this reason, if a default error process script file is registered, an error process (step S909 in FIG. 9) based on the default error process script file is executed. If no default error process script file is registered, a default system error process (step S911 in FIG. 9) is executed.

If an error occurs in association with the input document data, the hot folder 13002 transmits, to the hot folder 13001 of the input source, the document data, error event, and a history information list containing history information representing a process history. When the document data has a history of a plurality of processes, the history information list contains a plurality of pieces of history information corresponding to the processes.

The history information representing the process history includes, for example, an image forming apparatus 100 serving as a network device that has executed processes, hot folders in the image forming apparatus 100, and process IDs that specify processes in the hot folders. The processes need not always be executed by the single image forming apparatus 100. For example, to process print data to execute a print process, the image forming apparatus 100 may execute a plurality of processes in cooperation with another image forming apparatus 120 or 130, or a PC 140 connected via a LAN 2011.

A CPU 2001 and network I/F 2010 of the image forming apparatus 100 can transmit/receive the document data process result by the hot folder and the history information list containing history information to/from another device via the LAN 2011.

The history information is generated when the hot folder executes an operation and added to the operation execution result.

When a plurality of hot folders cooperatively execute processes, the operation execution result and history information are transmitted or received as a pair. When a plurality of hot folders cooperatively execute processes, history information generated at the data input destination (hot folder 13002 in FIG. 13) is added to history information received from the data input source (hot folder 13001). By referring to the history information, the operation execution result (for example, document data input by executing an "OCR" operation) in the hot folder can uniquely be specified.

(Description of History Information)

Figure 14A:
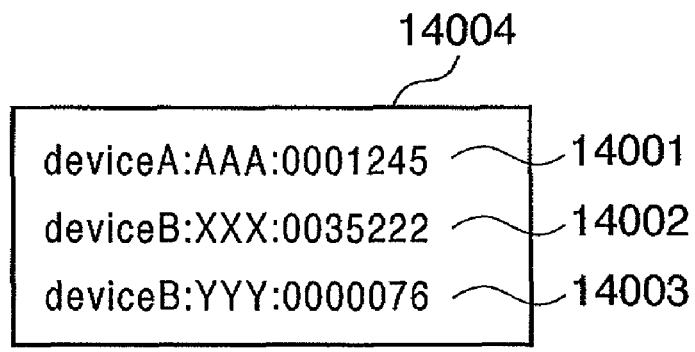
FIGS. 14A to 14C are views showing detailed example of history information lists containing three pieces of history information.

FIG. 14A is a view showing a detailed example of a history information list 14004 containing three pieces of history information. FIG. 14A shows pieces of history information 14001, 14002, and 14003 which are related to three processes and represent that the three processes are executed in this order.

Each history information includes three fields. For example, in the history information 14001, "deviceA:AAA: 0001245" are stored in the fields. The first field "deviceA" indicates a name unique to a network device (for example, image forming apparatus 120) that has executed the process. A name, a numerical value, or the network address (IP address or MAC address) of the image forming apparatus 120 (network device) can also be used if it can uniquely specify the image forming apparatus 120 on the network.

The next field "AAA" indicates the name of a hot folder in the specified image forming apparatus 120. Any other data except the name can be used if it can specify the hot folder.

The final filed "0001245" is identification information (ID) to specify a process in the hot folder "AAA".

The history information 14002 represents the history of a process "0035222" of a hot folder "XXX", which is executed by "deviceB" after the process "0001245" of the hot folder "AAA" of "deviceA". The "deviceB" indicates a network device different from "deviceA", for example, image forming apparatus 100. That is, different hot folders in different network devices together execute the processes.

The history information 14003 represents the history of a process "0000076" of a hot folder "YYY", which is executed by "deviceB" after the process "0035222" of the hot folder "XXX" of "deviceB". In this case, different hot folders in a single network device (deviceB) together execute the processes.

By referring to each history information contained in the history information list, a network device (image forming apparatus) that has executed a process, a hot folder in which a process is executed, and a process executed in a hot folder can be specified.

For example, when the hot folder 13001 shown in FIG. 13 has the history information 14002 in FIG. 14A, the history information of the process that is executed by the hot folder 13002 upon receiving the document data corresponds to the history information 14003 in FIG. 14A.

If an error occurs in the process of document data input to the hot folder 13002 (YYY in FIG. 14A), the CPU of the image forming apparatus (deviceB) checks the document data input source on the basis of the history information list 14004. In the example in FIG. 14A, the image forming apparatus (deviceB) and hot folder (XXX) are specified as the input source on the basis of the history information 14002 representing that a process is executed immediately before data input to the hot folder 13002 (YYY).

Under the control of the CPU of the image forming apparatus (deviceB), the hot folder 13002 generates a history information list 14005 (FIG. 14B) by deleting the history information (history information 14003) of its own from the history information list 14004. The hot folder 13002 transmits the history information list 14005, the document data with the error, and the error event that has occurred in the hot folder 13002 to the hot folder 13001 (XXX) as the document data input source.

The hot folder 13001 (XXX) generates an error event to execute an error process in accordance with the received error event and executes an error process based on the registered error process script files 13005a to 13005c.

Under the control of the CPU of the image forming apparatus (deviceB), the hot folder 13001 generates a history information list 14006 (FIG. 14C) by deleting the history information 14002 of its own from the history information list 14005 after the end of the error process. The hot folder 13001 specifies the data input source on the basis of the history information 14001 described in the history information list 14006. The history information 14001 represents the history of the process executed immediately before when viewed from the image forming apparatus (deviceB).

In the example in FIG. 14A, deviceA, hot folder AAA, and the identification information 0001245 of the process of the hot folder AAA are specified as the data input source. Under the control of the CPU of the image forming apparatus (deviceB), the hot folder 13001 transmits the document data, error event, and history information list 14006 to the deviceA and hot folder AAA as the data input source via the network.

When a plurality of hot folders cooperatively operate, the hot folder of the data input source can be specified (backtracking) on the basis of the history information list containing history information corresponding to each operation. If an error process script file is registered in the specified hot folder, the error process can be executed in accordance with the error event transmitted from the hot folder of the error occurrence source.

Figure 14B:
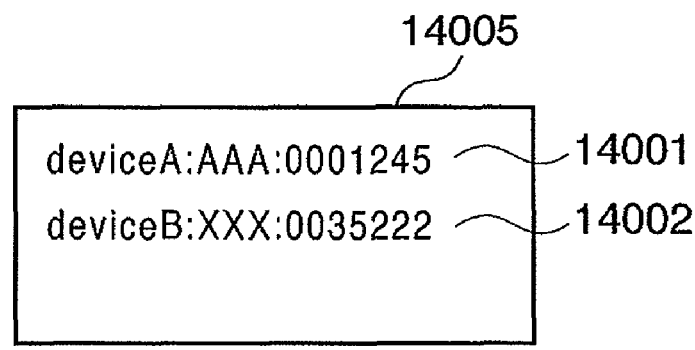
Figure 14C:
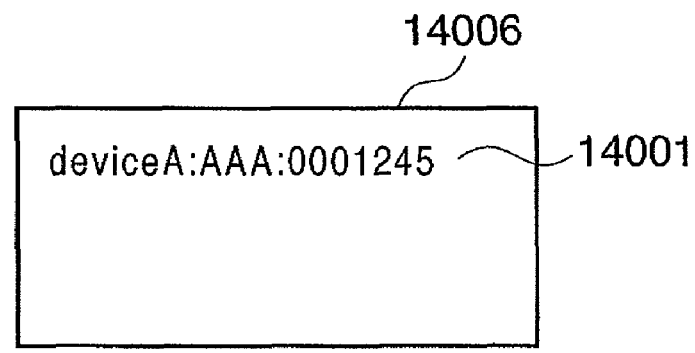

In the example shown in FIGS. 14A to 14C, all hot folders as the data input source are sequentially specified by backtracking on the basis of the history information list, and the error process registered in each hot folder is executed. However, the present invention is not limited to this. For example, instead of generating a history information list, the error process may be returned to only the hot folder of the input source immediately before. More specifically, if an error occurs during the process of a hot folder, the CPU of the image forming apparatus can transmit document data and error event to the hot folder of the data input source that has executed a process immediately before.

If one of the hot folders executes an error process in the course of sequentially specifying them by backtracking, a history information list containing information representing the execution of the error process can be generated. In this case, after one of the hot folders executes the error process, execution of the next error process can be inhibited by referring to the information that is contained in the history information list and represents the execution of the error process. Alternatively, a specific error process script is separately registered. In executing the next error process, the information representing the execution of the error process is referred to, and an error process based on the specific error process script can be executed.

[Sequence of Error Processes Executed Cooperatively by Hot Folders]

Figure 15:
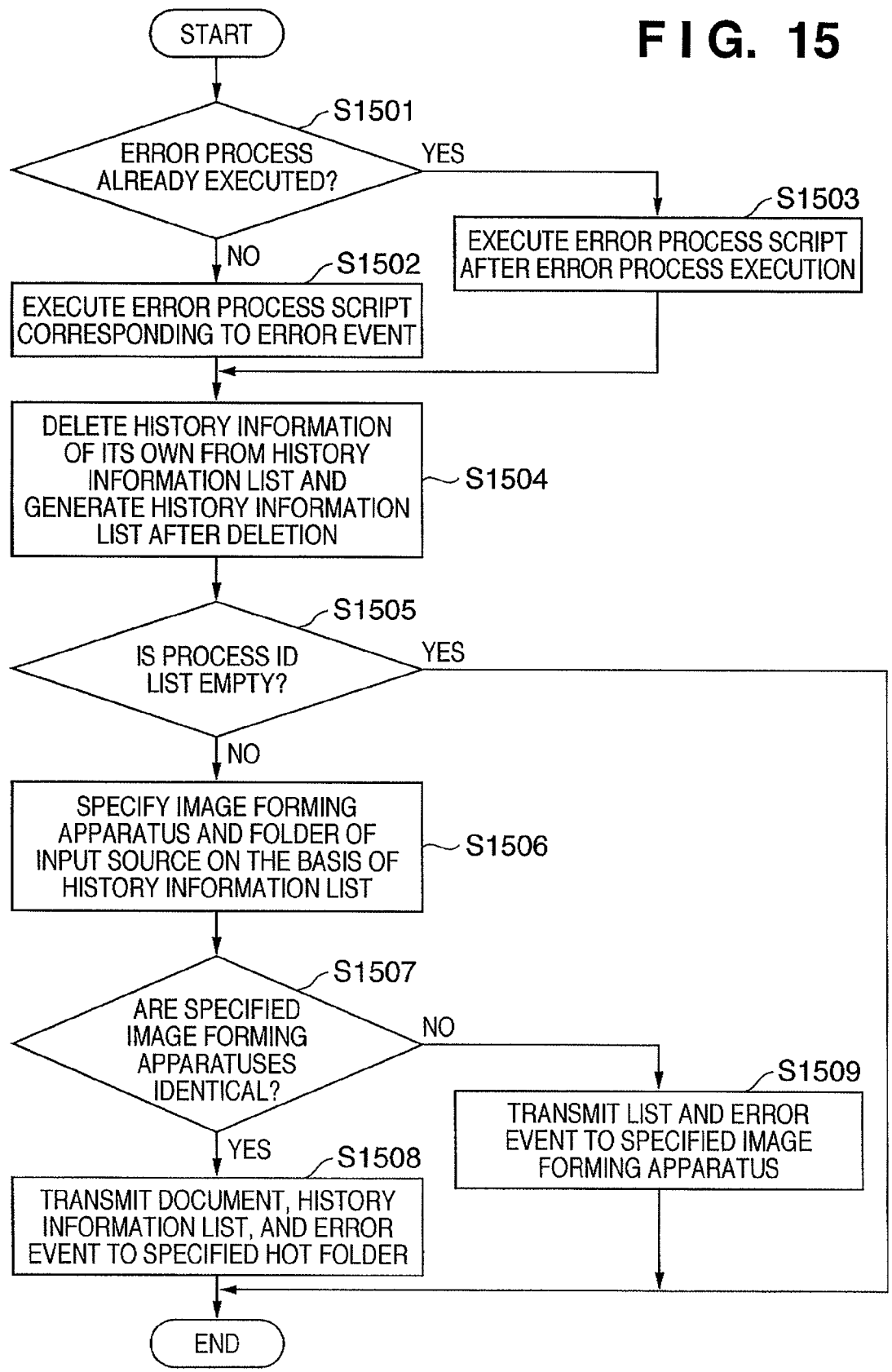
FIG. 15 is a flowchart for explaining the sequence of error processes executed cooperatively by hot folders.

The sequence of the above-described error processes executed cooperatively by the hot folders will be described with reference to the flowchart in FIG. 15. This process is executed under the control of the CPU of the image forming apparatus.

In step S1501, it is determined whether an error process is already executed in the course of specifying the hot folders of the data input source by backtracking. Whether an error process is already executed can be determined on the basis of the presence/absence of information contained in the history information list and representing the execution of an error process.

If it is determined in step 31501 that no error process is executed yet (NO in step S1501), the process advances to step S1502. If an error process is executed (YES in step S1501), the process advances to step S1503.

In step S1502, a hot folder (for example, hot folder 13001 in FIG. 13) executes a process corresponding to an error event transmitted from a hot folder (for example, hot folder 13002 in FIG. 13) where an error has occurred. When an error process script file is registered in the hot folder that has received the error event, an error process based on the contents of the registered error process script file is executed, and the process advances to step S1504.

In step S1503, when an error process is already executed, and the next error process is to be executed, an error process based on an error process script file (specific error process script) after error process execution is executed. As the "specific error process script", an error process to be executed may be specified, or execution of another error process may be inhibited after an error process is already executed.

In step S1504, the hot folder deletes the history information of its own and generates a history information list after deletion.

In step S1505, it is determined whether the history information list after deletion is empty (a registered hot folder or the like exists). If the history information list is empty (YES in step S1505), the hot folder concerned is the first document input source (corresponding to, for example, hot folder (AAA) in FIG. 14A). Hence, the process is ended.

If it is determined in step S1505 that the history information list is not empty (NO in step S1505), the process advances to step S1506.

In step S1506, the image forming apparatus and hot folder as the input source which has input document data to the hot folder concerned are specified on the basis of the history information list generated in step S1504.

In step S1507, it is determined whether the image forming apparatus of the input source specified in step S1506 equals the image forming apparatus in which the hot folder concerned exists. That is, it is confirmed whether the hot folder of the input source also exists in the same image forming apparatus. If the image forming apparatuses are identical (YES in step S1507), the process advances to step S1508.

In step S1508, the document data, the history information list generated in step S1504, and the error event that has occurred are transmitted to the hot folder specified based on the history information list. For example, transmission from the hot folder YYY to the hot folder XXX in FIG. 14A is executed, and the process is ended.

If it is determined in step S1507 that the image forming apparatuses are different (NO in step S1507), the process advances to step S1509.

In step S1509, the document data, the history information list generated in step S1504, and the error event that has occurred are transmitted to the image forming apparatus specified based on the history information list. For example, transmission from the image forming apparatus (deviceB) to the image forming apparatus (deviceA) in FIG. 14A is executed, and the process is ended.

In this flowchart, determination in step S1501 or S1507 is always performed. If the determination is unnecessary, the process in step S1502 or S1503 may be executed directly, or the process in step S1508 or S1509 may be executed directly.

Document data transmission between different image forming apparatuses increases the load on communication traffic in the network. To reduce the load, only the error event and history information list may be returned to the document data input source without returning the document data.

According to this embodiment, even when hot folders cooperatively execute processes, it is possible to specify the data input source on the basis of the history information list and execute, at the data input source, the error process corresponding to the error event that has occurred.

Third Embodiment

In the third embodiment, an arrangement for automatically selecting an error process script file based on hot folder holder information will be described.

Figure 16:
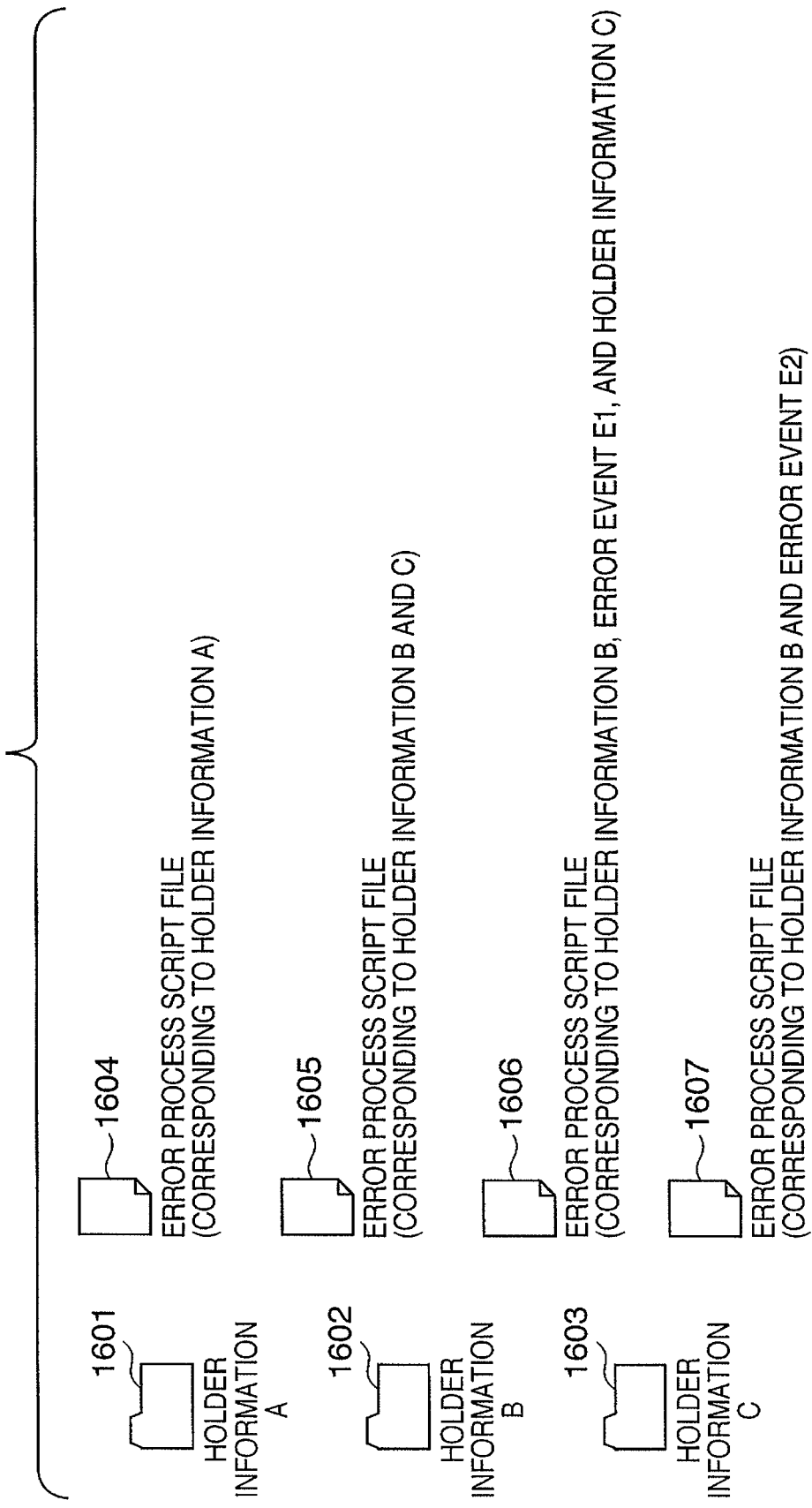
FIG. 16 is a view for explaining an arrangement which automatically selects an error process script file from the holder information of a hot folder.

Referring to FIG. 16, hot folders 1601, 1602, and 1603 have hot folder setting files (not shown). Pieces of holder information A, B, and C are set for the hot folders 1601, 1602, and 1603, respectively. Holder information can also be set for a hot folder setting file or separately set under the control of a CPU 2001 of an image forming apparatus.

Error process script files 1604 and 1605 of this embodiment are not individually registered in the hot folders, unlike the first and second embodiments.

The error process script files 1604 and 1605 of this embodiment have information associated with the holder information. The CPU 2001 of an image forming apparatus 100 can compare holder information on the hot folder side with that on the error process script file side and associate a hot folder with an error process script file with the same holder information.

For example, when an error occurs in the hot folder 1601, the process of the error process script file 1604 which has information associated with the holder information A is executed. When an error occurs in the hot folder 1602, the process of the error process script file 1605 which has information associated with the holder information B is executed. When an error occurs in the hot folder 1603, the process of the error process script file 1605 which contains information associated with the holder information C is executed.

Settings of an error process script file can be done not only by information associated with holder information but also by combining an error event that occurs in a hot folder with holder information. The CPU 2001 of the image forming apparatus can control execution of an error process on the basis of the combination of holder information and an error event that occurs in a hot folder which are set in an error process script file.

The holder information B and an error event E1 are set for an error process script file 1606. An error process script file 1607 has the holder information C but no error event condition set in correspondence with the holder information C. The holder information B and an error event E2 are also set for the error process script file 1607.

For examples when the error event E1 occurs in the hot folder 1602, the CPU 2001 determines that the conditions of the holder information B and error event E1 are satisfied and executes the process of the error process script file 1606. On the other hand, when the error event E2 occurs in the hot folder 1602, the CPU 2001 determines that the conditions of the holder information B and error event E2 are satisfied and executes the process of the error process script file 1607.

Even when the error event E1 or E2 occurs in the hot folder 1603, the CPU 2001 specifies the error process script file 1606 associated with the holder information C and executes the process of the error process script file 1606.

According to this embodiment, it is possible to control execution of an error process by setting a combination of an error event that occurs in a hot folder and the holder information of the hot folder in an error process script file.

Other Embodiments

The object of the present invention can also be achieved by supplying a storage medium which records software program codes for implementing the functions of the above-described embodiments to a system or apparatus. The object can also be achieved by causing the computer (or CPU or MPU) of the system or apparatus to read out and execute the program codes stored in the storage medium, of course.

In this case, the program codes read out from the storage medium implement the functions of the above-described embodiments by themselves, and the storage medium which stores the program codes constitutes the present invention.

Examples of the storage medium to supply the program codes are a flexible disk, hard disk, optical disk, magnetooptical disk, CD-ROM, CD-R, nonvolatile memory card, and ROM.

The functions of the above-described embodiments are implemented when the computer executes the readout program codes. The above-described embodiments are, of course, also implemented when the OS (Operating System) running on the computer partially or wholly executes actual processing on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-022237, filed Jan. 31, 2007, which is hereby incorporated by reference herein in its entirety.

What is claimed is:

1. An image forming apparatus comprising:
a detection unit adapted to detect data which is input to any one of a plurality of storage areas;
an input process specifying unit adapted to specify a process registered in association with the storage area to which the data is input;
a process execution unit adapted to execute the process, for the data which is input to the storage area, specified by the input process specifying unit in accordance with detection of said detection unit;
an error event generation unit adapted to generate an error event to execute an error process when an error is detected during execution of the process by said process execution unit, wherein said error event generation unit generates a user error event based on user settings if an error process script is set in the storage area, and generates a system error event if the error process script is not set in the storage area;
an error process specifying unit adapted to specify, based on the error event generated by the error event generation unit, an error process registered in association with the storage area to which the data is input; and
an error process execution unit adapted to execute the error process specified by the error process specifying unit.

2. The apparatus according to claim 1, wherein said error process execution unit determines presence/absence of registration of an error process script file which specifies an error process to be executed in correspondence with the error event generated by said error event generation unit,
executes the error process specified by the error process script file in accordance with the determination result if the error process script file is registered, and executes a default error process in accordance with the determination result if the error process script file is not registered.

3. The apparatus according to claim 1, further comprising:
a generation unit adapted to generate history information representing a history of the process of the data by said process execution unit; and
a communication unit adapted to execute communication to transmit/receive the data process result and a history information list including the history information to/from another device via a network to cause said other device to process the data process result by said process execution unit.

4. The apparatus according to claim 3, wherein when said communication unit receives the data process result and the history information list transmitted from said other device, said process execution unit processes the received data by using the attribute of the process set in the storage area.

5. The apparatus according to claim 1, wherein said error event generation unit generates an error event to execute an error process when an error is detected during execution of the process of the received data.

6. The apparatus according to claim 3, further comprising a specifying unit adapted to specify an input source of the data process result and the history information list on the basis of the history information list received by said communication unit,
wherein when said error event generation unit generates an error event for the process of the received data, said communication unit transmits the error event to the input source specified by said specifying unit.

7. The apparatus according to claim 6, wherein when said communication unit receives the error event transmitted from said other device, said error process execution unit executes the error process associated with the storage area in accordance with the error event received by said communication unit.

8. A method of controlling an image forming apparatus, comprising the steps of:
a detection step of detecting data which is input to any one of a plurality of storage areas;
an input process specifying step of specifying a process registered in association with the storage area to which the data is input;
a process execution step of executing the process, for the data which is input to the storage area, specified by the input process specifying step in accordance with detection of said detection step;
an error event generating step of generating an error event to execute an error process when an error is detected during execution of the process in the process executing step, wherein said error event generating step generates a user error event based on user settings if an error process script is set in the storage area, and generates a system error event if the error process script is not set in the storage area;
an error process specifying step of specifying, based on the error event generated by the error event generation step, an error process registered in association with the storage area to which the data is input; and
an error process executing step of executing the error process specified by the error process specifying step.

9. The method according to claim 8, wherein in the error process executing step,
- presence/absence of registration of an error process script file which specifies an error process to be executed in correspondence with the error event generated in the error event generating step is determined,
- the error process specified by the error process script file is executed in accordance with the determination result if the error process script file is registered, and a default error process is executed in accordance with the determination result if the error process script file is not registered.

10. The method according to claim 8, further comprising the steps of:
- generating history information representing a history of the process of the data in the process executing step; and
- executing communication to transmit/receive the data process result and a history information list including the history information to/from another device via a network to cause said other device to process the data process result in the process executing step.

11. The method according to claim 10, wherein when the data process result and the history information list transmitted from said other device are received in the communicating step, the received data is processed by using the attribute of the process set in the storage area in the process executing step.

12. The method according to claim 8, wherein in the error event generating step, an error event to execute an error process is generated when an error is detected during execution of the process of the received data.

13. The method according to claim 10, further comprising the step of specifying an input source of the data process result and the history information list on the basis of the history information list received in the communicating step,
- wherein when an error event for the process of the received data is generated in the error event generating step, the error event is transmitted, in the communicating step, to the input source specified in the specifying step.

14. The method according to claim 13, wherein when the error event transmitted from said other device is received in the communicating step, the error process associated with the storage area is executed in the error process executing step in accordance with the error event received in the communicating step.

15. A program which is stored in a computer-readable storage medium to cause a computer to execute an image forming apparatus control method of claim 8.

* * * * *